Figure 1:
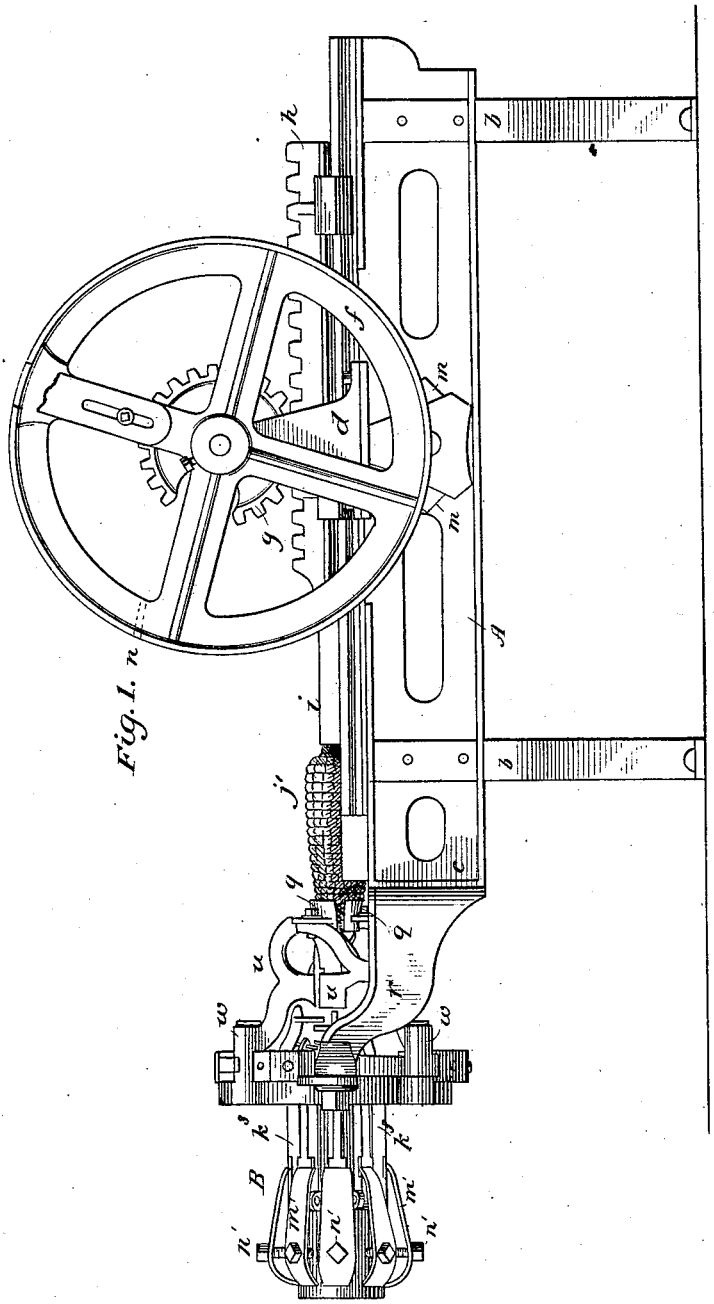

(Model.)

V. BARKER.
MACHINE FOR CUTTING GREEN CORN FROM THE COB.

No. 243,829. Patented July 5, 1881.

5 Sheets—Sheet 1.

Attest:
R. T. Barnes.
W. T. Cole

Inventor:
John Barker
By F. C. Somes,
Attorney.

(Model.)

V. BARKER.
MACHINE FOR CUTTING GREEN CORN FROM THE COB.

No. 243,829. Patented July 5, 1881.

Attest:
R. H. Barnes.
W. T. Cole.

Inventor:
Volney Barker,
By F. C. Somes,
Attorney.

(Model.)

V. BARKER.
MACHINE FOR CUTTING GREEN CORN FROM THE COB.

No. 243,829. Patented July 5, 1881.

5 Sheets—Sheet 3.

(Model.)

V. BARKER.
MACHINE FOR CUTTING GREEN CORN FROM THE COB.

No. 243,829. Patented July 5, 1881.

5 Sheets—Sheet 4.

(Model.) 5 Sheets—Sheet 5.

V. BARKER.

MACHINE FOR CUTTING GREEN CORN FROM THE COB.

No. 243,829. Patented July 5, 1881.

Attest: Inventor:

UNITED STATES PATENT OFFICE.

VOLNEY BARKER, OF PORTLAND, MAINE.

MACHINE FOR CUTTING GREEN CORN FROM THE COB.

SPECIFICATION forming part of Letters Patent No. 243,829, dated July 5, 1881.

Application filed February 7, 1881. (Model.)

*To all whom it may concern:*

Be it known that I, VOLNEY BARKER, a citizen of the United States, residing in Portland, in the county of Cumberland and State of Maine, have invented certain new and useful Improvements in Machines for Cutting Green Corn from the Cob, of which the following is a specification.

My improvements are applicable especially to such a machine as was patented to me by the Letters Patent of the United States No. 159,741, dated February 16, 1875, but are also applicable to other machines of similar construction. They relate particularly to that part of the machine termed "the head," or the part containing the gages, knives, and scrapers.

The objects of these improvements are, first, to provide such a construction as will allow cutting and scraping the kernels from all sizes of ears of corn with equal facility and completeness without requiring any changes in the machine except as respects a mere adjustment of parts; secondly, to so arrange the several parts of the machine as most effectually to prevent any loss of the corn after it is dissevered from the cob by its passing either through or outside of and beyond the waste-tube; thirdly, to so dispose the various parts as to allow, with due regard to the accomplishment of the above-mentioned objects, the utmost facility for the clearance of the cut and scraped corn, so the kernels and juice will readily drop into a convenient receptacle, and will not, by adhering to the working parts of the machine, cause inconvenience from clogging or difficulty from gumming up parts which are subject to friction upon each other by the thickening of the corn-juice to an adhesive paste, or cause deterioration of the quality of the dissevered corn by parts thereof remaining so long upon the machine (especially during very hot or damp days) as to result in souring; fourthly, to so construct and arrange the several parts as to permit widely opening those portions which support the gages and knives to give ready access to the interior of the head, for the purpose of cleaning, and for convenience in readily removing and replacing the knives in case of sharpening. I attain these objects by the mechanism illustrated in the accompanying drawings, in which—

Figure 2:
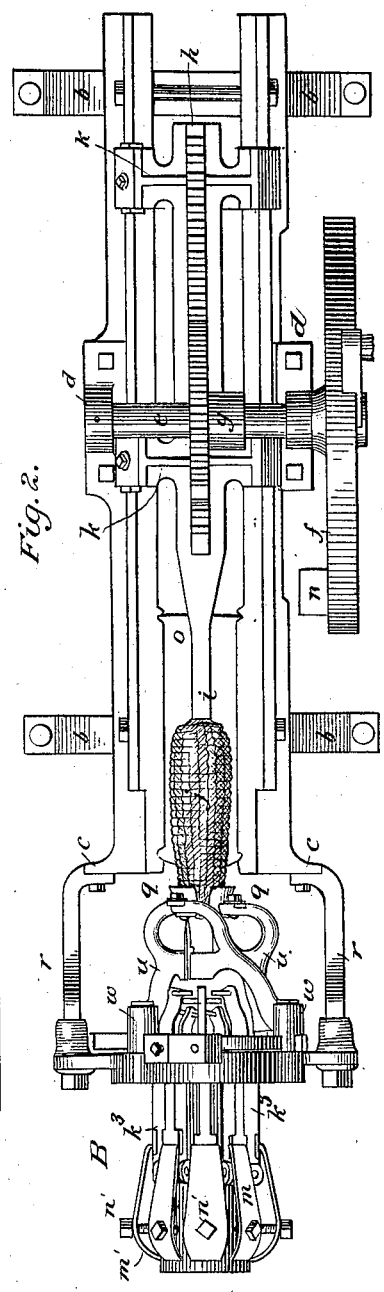
Figure 3:
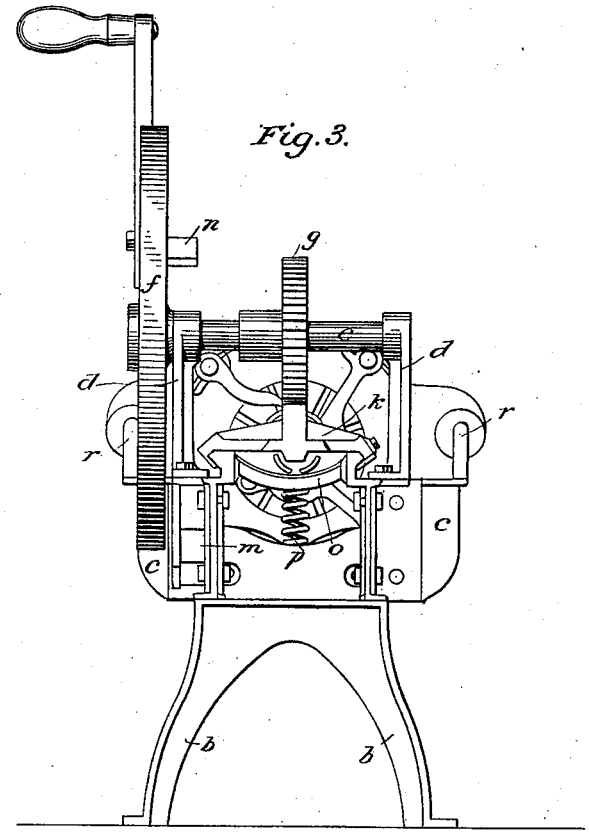
Figure 4:
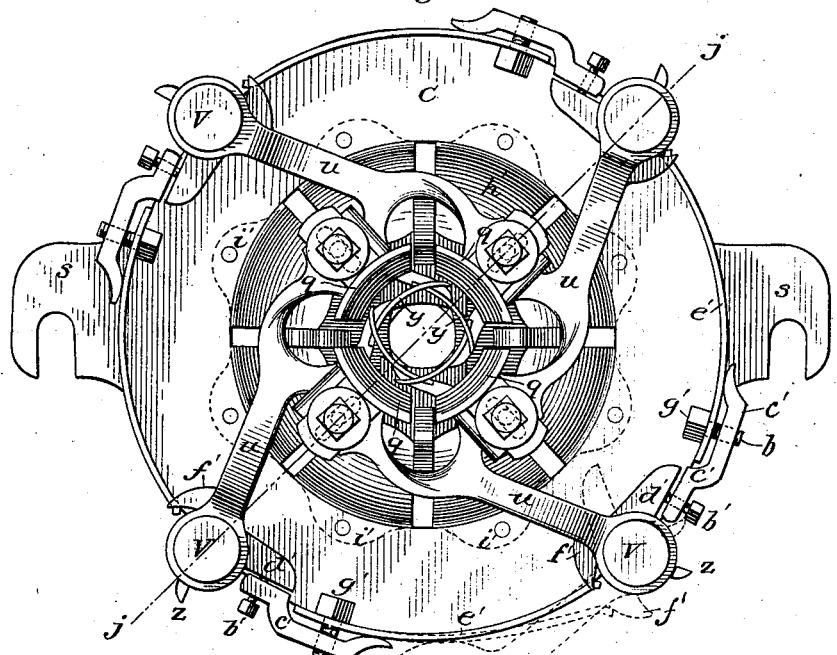
Figure 5:
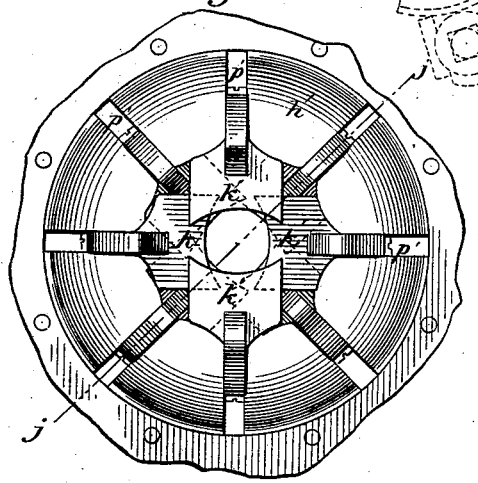
Figure 6:
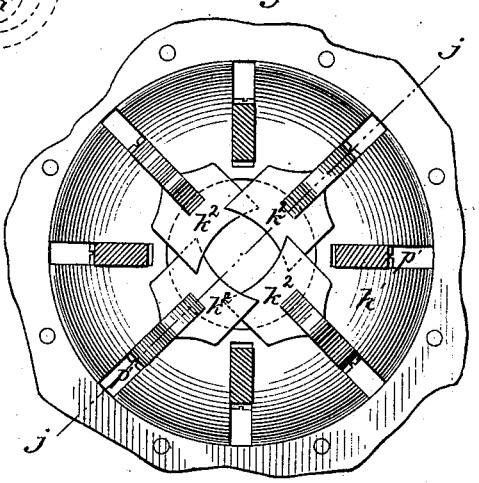
Figure 7:
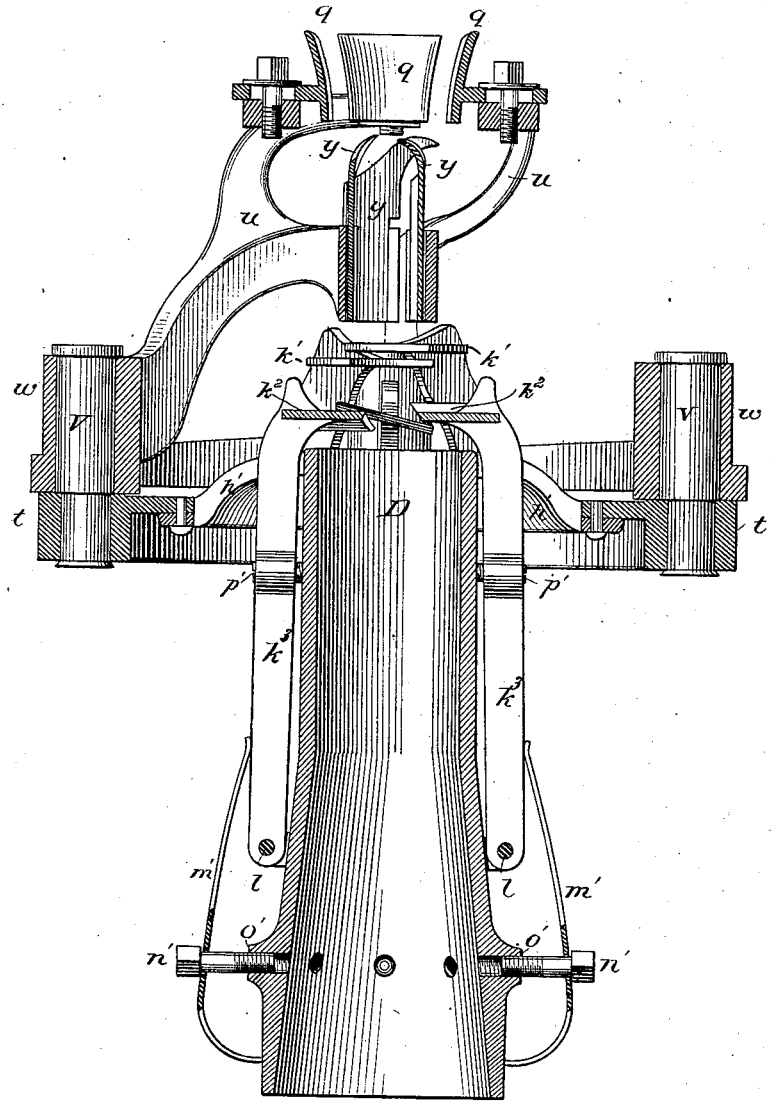
Figures 8, 9:
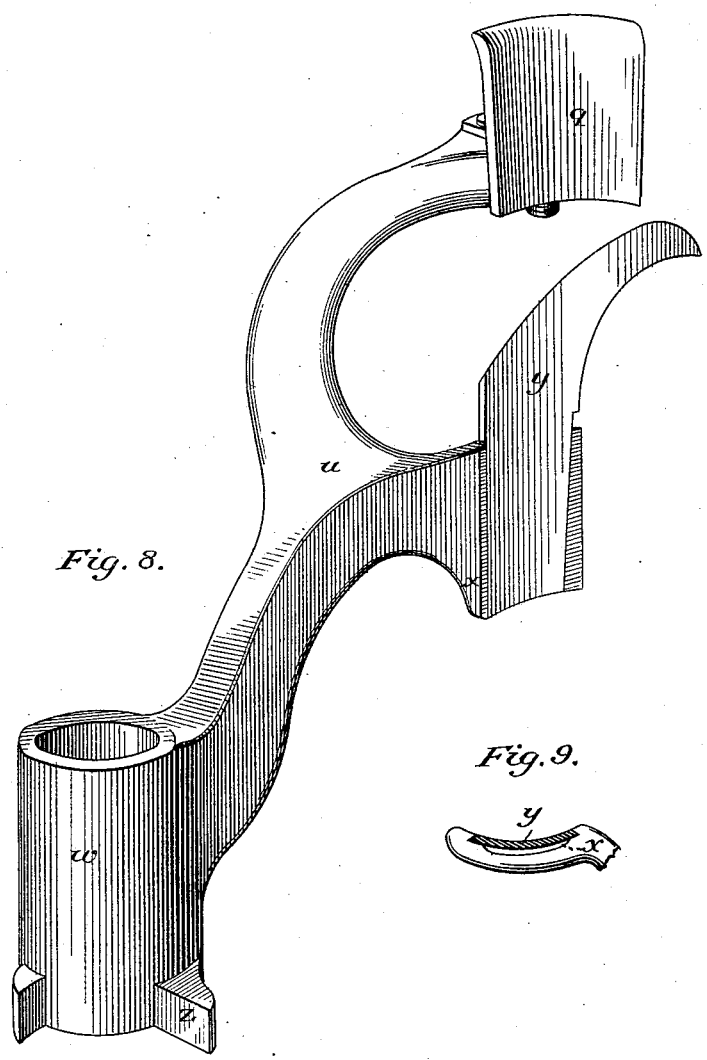

Figure 1 is a side view of the machine. Fig. 2 is a top-plan view; Fig. 3, an end view at the extremity opposite that which supports the head; Fig. 4, a front elevation of the head of the machine, toward the part which contains the rod or plunger for pushing through the ear of corn, showing the position of the gages and knives, with their attachments, also illustrating the position of one of the arms for the support of a gage or knife when thrown back to its greatest distance from the central or axial line of the head; Fig. 5, a detached front elevation of that portion of the head in the rear of the knives, showing the position of the two front pairs of scrapers; Fig. 6, a similar elevation, showing the position of the two rear pairs of scrapers; Fig. 7 (which is drawn to a scale about half the actual size of the parts represented therein, which scale is reduced one-third in the photolithograph copy of the drawings attached to the Letters Patent) a longitudinal sectional view of the head as divided by a plane in the direction of and coincident with the axial line of the head, (the place of division being indicated by the dotted lines *j j* in Figs. 4, 5, and 6; Fig. 8, a perspective view of one of the arms of the head for the support of the knives, said arm being represented in an upright position; and Fig. 9, a detail view of the part of that branch of the arm which supports the knife.

Like letters refer to corresponding parts throughout the several views.

A represents the side of the frame of the machine, supported by the legs *b b*, and terminating at the end toward the head in the flange *c*.

On the top of the frame A, nearly midway, and upon each side thereof, are bolted the upright standards *d d*, affording support to the crank-shaft *e e*, and having at one end thereof the crank-wheel *f*.

Upon the middle of the crank-shaft *e e* is the segmental gear *g*. This gear meshes into a horizontal rack, *h*, having at its forward end the rod or plunger *i*, which forms a continuous piece with the same, and when in operation pushes the ear of corn *j'* through the cutting and scraping devices of the machine. This rack is supported by cross-pieces *k k* running upon ways on the sides of the frame. The segmental gear $g$ is prevented from revolving in either direction beyond the range of that portion of its circumference which gears into the rack $h$ by means of a projection, $n$, on the rim of the crank-wheel, which strikes against projecting rubber blocks $m\ m$, which are inserted in recesses cast in the side of the frame.

Beneath the plunger is placed the concave plate $o$, which is fitted loosely between the sides of the frame, and supported centrally from beneath by means of a spiral spring, $p$, allowing it to be depressed slightly upon receiving any but the smallest ears of corn, so that said ears may be properly centered between the end of the plunger and the guides or gages $q$.

To the flanges $c$ on the end of the frame are bolted the arms $r\ r$, which at the farther ends give support to the detachable head B. This head is secured to the arms by means of the slotted ears $s\ s$, Fig. 4, the said ear-pieces resting down upon studs at the ends of the arms, and being secured thereto by means of nuts upon ends of the same. These ears are cast on the circular plate C, Fig. 4, which is strengthened by a marginal flange or rim in the rear, and is also provided with four circular bosses, $t$, for the support of four pivoted arms, $u$, placed equidistant from each other and at a distance of an eighth of the circumference of the plate from the ears $s\ s$.

The arms $u$ are pivoted to the bosses $t$ by means of studs V passing through said bosses and through the hubs or tubular ends $w$ of such arms.

At the opposite ends of the arms are the guides or gages $q$, which are adjustable toward and from the central line of the head by means of slots and screws, and are prevented from displacement laterally by having the supporting parts of said gages fitted within a groove.

The branch of the knife-arm in the rear of the gage is provided at the inner end with a groove, $x$, tapering toward the rear, the sides of the groove being beveled so as to make it narrowest outwardly. This groove (shown in Fig. 9) affords support for the tapering shank of the knife $y$, which shank is placed wholly on that side of the middle of the cutting-edge of the knife which is nearest the supporting-branch of the arm, this arrangement allowing the use of broader and stronger shanks to the knives without the arms interfering with each other when in a closed position.

The hub $w$ of each arm has at its base a projection, $z$, which serves as a stop when the arm $u$ is swung back on its stud or pivot to the position shown by the dotted outline $a'$ in Fig. 4. The shape of the knives (which may be made of plate-steel and struck out in a die) is illustrated mainly in Fig. 8, said knives being concave and their cutting-edges being oblique to the line of motion of the ear of corn as it passes through the machine, as shown in Fig. 7, and the blades overlapping, as represented in Fig. 4, except when opened sufficiently for cutting the largest ears of corn. The degree of curvature of these knives which I find most desirable is such that when they are opened to the greatest extent for cutting the largest ears of corn they will form a true circle, the center of which is coincident with the axial line of the head; but I do not limit myself to such curvature.

It will be observed that the knifes and gages which stand directly opposite each other are attached to arms pivoted to diametrically-opposite points, and swinging in curves the reverse of each other and in a plane at right angles with the central line of the head. This arrangement affords an important advantage by enabling the knives throughout to maintain the same relative positions with respect to each other as the arms are uniformly opened or closed, thus causing each to bear equally upon the ears of corn, of whatever size.

The curvature of the gages, like that of the knives, should be such as to form, when fully opened, a complete circle, the center of which is the axial line of the head.

It will also be noticed (especially as shown in Figs. 2 and 7) that the shape of the arms is such as to allow the amplest room for the clearance of the dissevered corn between the rear of the gages and fronts of the scraping devices, hereinafter described.

Set-screws $b'$, passing through the irregularly-shaped flanged pieces $c'$, raised upon the front margin of the circular plate C, come in contact with the projection $d'$ at the base of tubular ends of the arms, and regulate the nearness of the approach of such arms to the central line of the head. The arms are held in position and pressed toward such line by the springs $e'$ pressing upon the cams $f'$ on the hubs of said arms. The tension of said springs is regulated by the set-screws $g'$ passing through the flanged piece $c'$, as shown in Fig. 4.

It will be noticed that the points of the cams $f'$ are so placed with reference to the bent ends of the springs as to allow them to pass beyond such ends when the arms are swung far outward, so that the arms may remain in such position, as is indicated by the dotted outline at the bottom of Fig. 4.

Attached to the circular plate C is a tube, D, a sectional view lengthwise of which is shown in Fig. 7. At the front end of this tube is a wide irregular flange, $h'$, convex in front and concave in the rear, and divided into separate parts by eight radial slots, as shown in Figs. 5 and 6. At the margin of this flange are ears $i'$, as indicated by dotted lines in the interior of Fig. 4. Screws passing through these ears from the rear secure the slotted flange, with its tube, to the rear of the plate C, the said flange closing into and filling a circular opening for that purpose in the plate C. The tube, as shown in Fig. 7, enlarges somewhat toward the rear, so as to allow a freer escape for the cobs which are pushed through the same. Surrounding this tube are eight scrapers, $k'\ k^2$, &c., attached to the tube, as shown in Figs. 1, 2, and 7, and passing forward through the radial openings in the wide flange $h'$ to positions a little in the rear of the branches of the arms which support the knives. It will be noticed that these radial openings are only sufficient for the accommodation of the vibrating arms $k^3$ of the scrapers, the flange $h'$ and plate C together forming a shield against the escape of corn to the rear. These scrapers are arranged in pairs, so that the concave edge of each directly confronts the corresponding edge of an opposing scraper. The blades of the foremost pair, as seen in Fig. 5, are a little in advance of the next pair, and slightly overlap them at both extremities when said scrapers are in a closed position. These two pairs are so placed that the middle of their scraping-edges comes opposite the points of intersection of the cutting-blades, as such intersection is shown in Fig. 4, and their faces opposed to the corn are at right angles with the length of the cob. The two succeeding pairs of scrapers $k^2$ $k^2$ have their faces set obliquely to the length of the cob, and at one extremity of the scraping-edge overlap the adjacent scraper, while at the opposite extremity they underlie the scraper next thereto. This construction admits of their being placed quite near to the mouth of the tube, and thus serves in a measure to close it against the dissevered corn. The blades of the several scrapers stand nearly at right angles, vertically, to the shanks $k^3$, which support them, and project inward therefrom, the said shanks being pivoted in the rear to ears $l'$ on the tube, as shown in Figs. 1, 3, and 7.

The scrapers are pressed toward the central line of the head by means of the springs $m'$, the forward ends of which rest upon the scraper-arm, and the rear ends upon the back end of the tube. The springs are held in position and receive such tension as is desirable from the screws $n'$ passing through them and into bosses $o'$ on the surface of the tube.

From the nature of these devices, as already explained, it will be apparent that the ears of corn are to be pushed through lengthwise between the gages, knives, and scrapers by the plunger, the forward end of which moves to a short distance beyond the blades of the rear scrapers. The gages, by their adjustability, serve to regulate the depth of cut for the following knives, and curving outward from rear to front so as to present a funnel-shaped opening, also serve as guides for properly centering the ears of corn as they approach the knives.

It is obvious that the head B of the machine, as herein described, may be readily detached therefrom and connected in a similar position with any other machine having a plunger of proper size and length of stroke to push the ears of corn through the same, and the manner in which such plunger is operated while working at a proper speed, or in which the ears of corn are sustained and centered before entering the head, is wholly immaterial as respects its successful working.

What I claim as my invention, and desire to secure by Letters Patent, is—

1. The pivoted spring-arms $u$, affording support laterally at their forward ends to the gages $q$ and knives $y$, and swinging outwardly in reverse curves in a plane at right angles with the axial line of the head, with the corresponding points of the arms always in the same vertical plane, substantially as described.

2. The tube D, enlarging toward the rear, and having the wide narrowly-slotted flange $h'$ thereon, in combination with the detachable plate C fastened thereto, substantially as described.

3. The tube D, having the wide narrowly-slotted flange $h'$ thereon, in combination with the scrapers $k^2$, presenting oblique scraping-edges toward the front, and set nearly back to the mouth of the tube D, substantially as and for the purposes hereinbefore set forth.

4. The tube D, having the wide narrowly-slotted flange $h'$ thereon, in combination with the four pairs of scrapers $h'$ $k^2$, the first two pairs toward the front presenting their scraping-edges at right angles with the axial line of the head, and the remaining pairs presenting their scraping-edges obliquely to said line, as hereinbefore described.

5. The pivoted spring-arms $u$, with their gages $q$ and knives $y$, the plate C, the flanged tube D, and scrapers $k'$ $k^2$, all constructed and combined substantially as above set forth.

6. The combination of the supporting-ring, the pivoted spring-arms arranged in pairs, those of each pair being pivoted at diametrically-opposite points and adapted to swing in reverse curves in a plane at right angles with the axial line of the head, the knives and gages attached to the arms, and the plunger, substantially as described.

7. The pivoted spring-arms $u$, attached to the plate C, and supporting the gages and knives $q$ $y$, in combination with the plunger $i$ and self-adjusting trough $o$, substantially as and for the purposes hereinbefore set forth.

VOLNEY BARKER.

Witnesses:
WALTER L. EMERY,
HATTIE L. EMERY.